March 29, 1949. L. OCHTMAN 2,465,601
ACTUATOR
Filed July 1, 1946 4 Sheets-Sheet 1
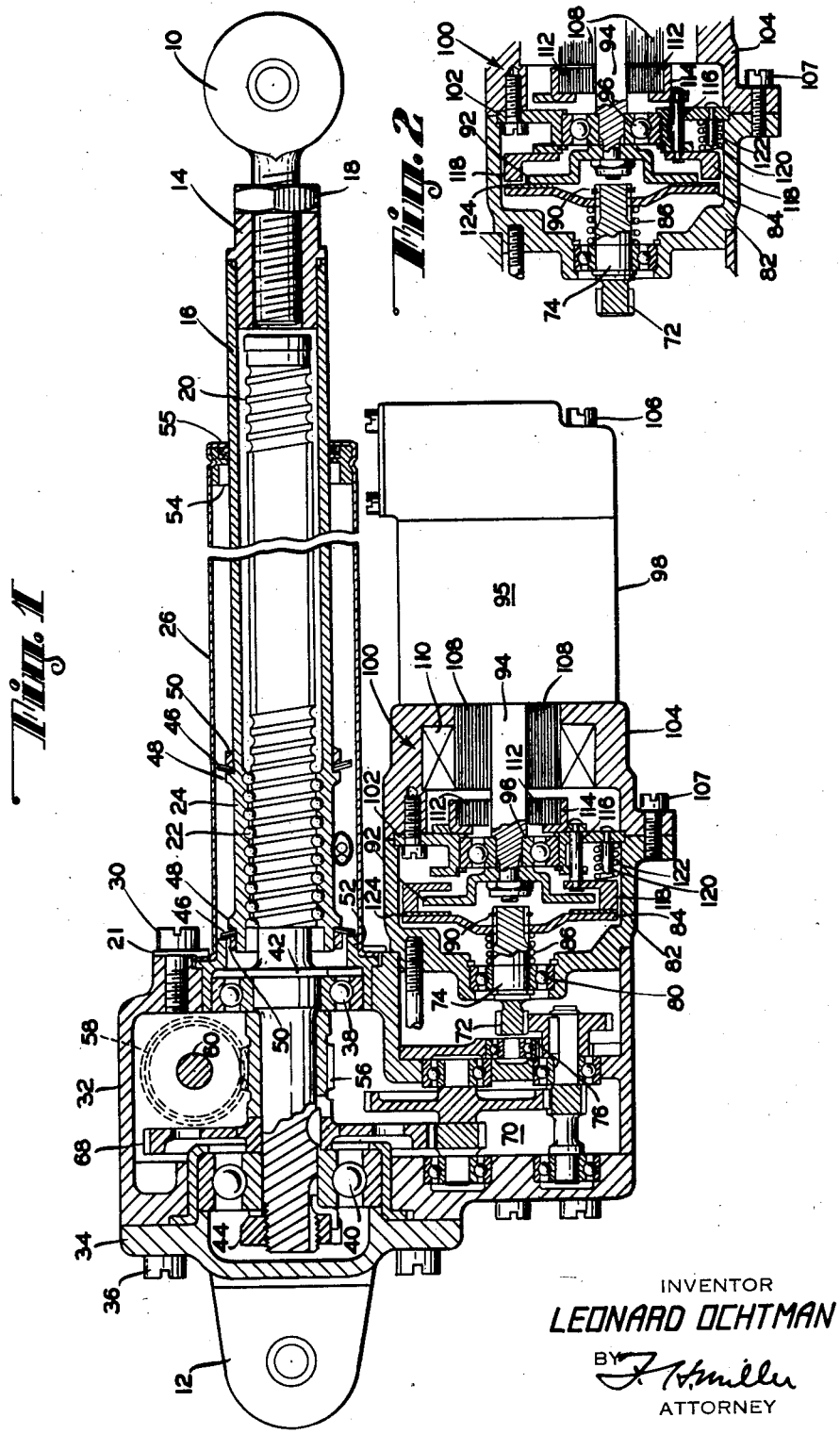
INVENTOR
LEONARD OCHTMAN
BY
F. H. Miller
ATTORNEY March 29, 1949. L. OCHTMAN 2,465,601
ACTUATOR
Filed July 1, 1946 4 Sheets-Sheet 2

INVENTOR
LEONARD OCHTMAN
BY
ATTORNEY

INVENTOR
LEONARD OCHTMAN
BY [signature]
ATTORNEY

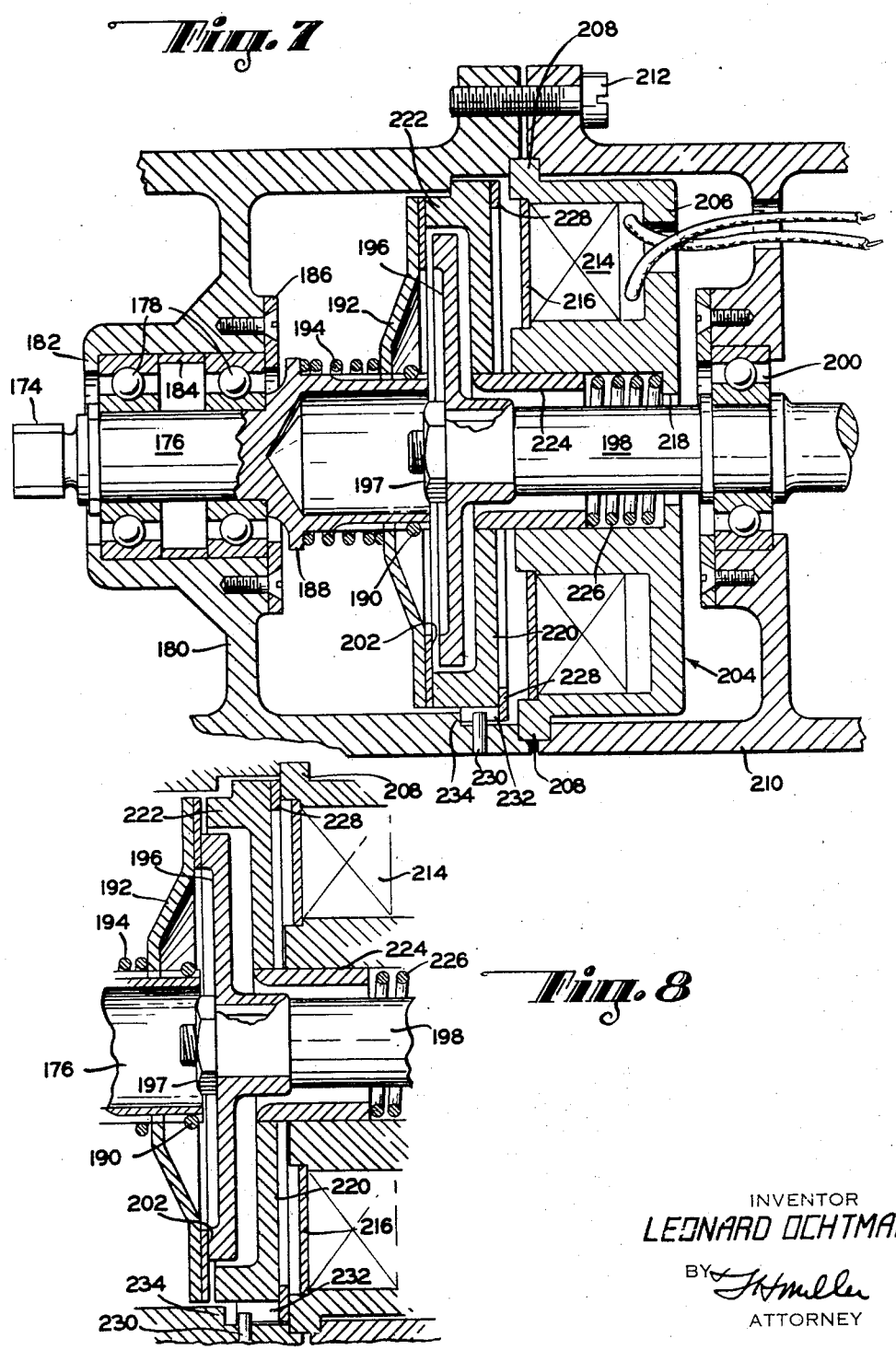

Patented Mar. 29, 1949

2,465,601

UNITED STATES PATENT OFFICE 2,465,601

ACTUATOR

Leonard Ochtman, Ridgewood, N. J., assignor to Bendix Aviation Corporation, Teterboro, N. J., a corporation of Delaware Application July 1, 1946, Serial No. 680,805

19 Claims. (Cl. 192—.02)

1

This invention relates to actuators, and particularly to means for operating members, such as tabs, flaps and other elements of aircraft.

In electrically operated actuators for such purpose it is imperative in certain applications that the elements be accurately positioned and stopped in any position to which they are moved, in an extremely short period of time after opening the electric circuit.

It is also imperative that such actuators should be as light in weight, and occupy as little space as possible, consistent with effective operation and other factors.

Certain features of actuators heretofore employed, and preventing accurate positioning and quick stops, reside in inertia and overtravel of parts, residual magnetism causing lag in the operation of electromagnets, and failure to effectively lock the driven elements in the positions to which they are moved.

Other objections to prior actuators reside in the use of clutches, in which a clutch member is actuated and held by the flux of an electromagnet whereby by reason of variable voltage the clutch is not adapted as means for accurately limiting the torque.

Various other objections are present in prior actuators, such as impact cushion stop means which are not of uniform yieldability, are not effective in short range movement, are not compact, and are otherwise not adapted for the quick stops above mentioned.

Among the objects of the present invention are to overcome the above-mentioned and other objections to prior structures, and to do so by novel and effective means.

Another object is to provide elements, such as a driving member, a driven member, a brake for the driven member, and a clutch arranged in novel relation for short travel relative to each other, whereby the driven member may be rapidly connected to the driving member and quickly disconnected therefrom and engaged by the brake.

Another object is to provide a driven clutch element, a driving member and a brake, as aforesaid, which are associated with each other and with electromagnet operating means therefor somewhat as are similar elements in prior clutch means, but wherein, in this instance, all of the parts, although controlled by the electromagnetic flux, are shielded therefrom, and actually operated in their positive clutching and braking actions by means independent of voltage variations and of more uniform dependable action.

2

Another object is to provide a novel actuator of the type constituted substantially as a simple self contained link, having ordinary eyes or other attaching means at its ends for connecting the link between two elements, at least one of which is to be actuated, and including a motor, an electromagnet, a clutch, a brake, gear reducing means, a screw shaft and all other necessary elements of a complete power unit.

Another object is to provide an actuator of the above-indicated type that is simple and durable in construction, economical to manufacture, and effective in its operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawings:

Figure 1 is a view, partially in side elevation and partially in section of an actuator constructed in accordance with the invention, and showing certain parts positioned as they are when an electrical circuit of the actuator is deenergized;

Figure 2 is a view of a portion of Figure 1 showing the aforesaid parts in positions occupied thereby when the circuit is energized;

Figure 7 is a view similar to Figure 6 of a further modification of the invention adapted for similar cooperation; and Figure 8 is a view, similar to Figure 2, of a portion of Figure 7, showing parts in different positions.

Figure 4:
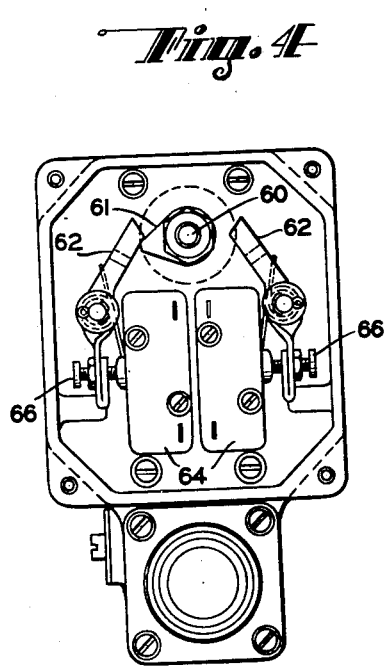
Figure 4 is an opposite side view, from that of Figure 1, showing parts at the left of Figure 3.
Figure 3:
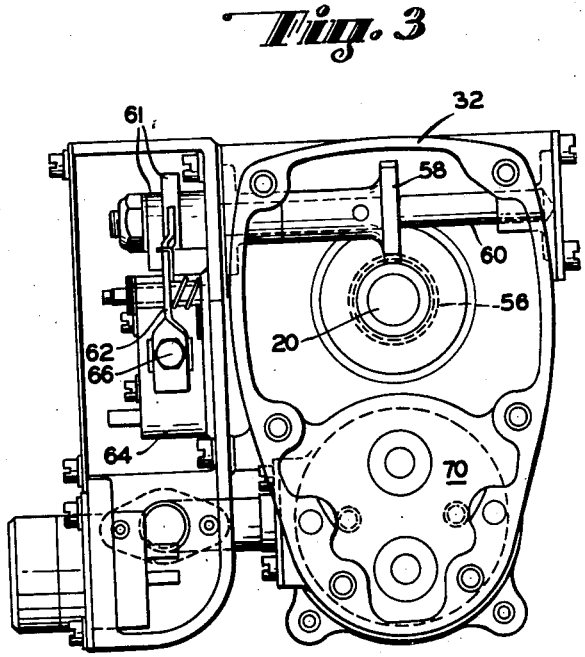
Figure 3 is an end view, taken from the left of Figure 1, certain parts removed.

Referring to Figures 1, 3 and 4, particularly to Figure 1, the device, as a whole in exterior appearance, is in the form of a comparatively simple elongated link having, in this instance, pivot eyes 10 and 12 for attaching the link between members, as of an airplane, to which it is desired to impart relative motion.

The eye 10 has a shank portion adjustably screw threaded into an outer end closure member or plug 14 fixed to an actuator element or tube 16 and held to the member 14 as by a nut 18. The tube 16 surrounds a screw shaft 20 embodying threads having round troughs for bearing balls 22 in a similarly threaded nut portion 24 of the tube 16.

A tubular cover 26 encloses most of the tube 16 in the retracted position of the latter, as shown, and has a radially outwardly extending flange at its inner end secured, as by a washer 21 and screws 30 to a gear housing 32. The eye 12 constitutes part of a cover 34 of the gear housing 32, which cover is also secured in position, as by screws 36.

The screw shaft 20 is journaled in anti-friction bearings 38 and 40 in the gear housing 32 and held axially in position by a shoulder 42 and a locked nut 44 cooperating with the inner races of the bearings 38 and 40, respectively.

The nut portion 24, which is held against turning by the means to which the eyes 10 and 12 are attached, carries belleville spring means 46 at each end held against shoulders 48 of the nut, as by rings 50 pressed in place on the nut.

These springs, which are of sheet metal, frusto-conical, and of washer-like shape, have characteristics effective against high stresses in short range of axial motion, and non-linear deflection, which does not vary appreciably over a substantial critical portion of such range, which renders them exceptionally effective in the combination hereof for quick short range cushion stop action, and conservation of space and weight, where coil springs, the deflection of which is linear, and other cushioning means, would be ineffective or of excessive bulk.

Although the springs may be employed singly or of various numbers in series, two are employed nested one within the other to increase the resistance of one spring in the given radial and axial space for the desired effect in this instance. The springs preload the screw and nut to prevent jamming and facilitate reverse operation of the nut.

At the left limit of travel of the tube 16, as viewed in Figure 1, the left-hand springs 46 engage a stop member 52, and, at the right limit of travel of the tube 16, the right hand springs 46 engage a stop member 54 held in the cover 26 against an inturned end flange 55 thereof.

In the gear housing 32, a worm 56, fixed to the shaft 20, engages a gear 58 fixed to a cross shaft 60, which carries cams 61 adapted to engage levers 62 for operating limit switches 64. The cams 61 are splined to the shaft 60 to provide approximate adjustment. Fine adjustment is effected through screws 66 on the levers 62. A gear 68, fixed to the screw shaft 20, constitutes the output gear of a gear train 70 having an input pinion 72 on a driven shaft 74, which is journaled in a ball bearing 76, at one side of the pinion 72, and in a ball bearing 80 in a housing portion 82 at the other side of the pinion 72.

A clutch disc 84 is splined to the driven shaft 74 for rotative movement therewith and axial movement relative thereto, being biased to the right, as shown in Figure 1, by a spring 86 of given force around the shaft 74 between the inner race of the bearing 80 and the disc 84. The latter is limited in its ultimate axial movement to the right, as by a lock ring 90 in a groove of the driven shaft 74, but need not reach this position in normal operation, as will further appear.

A driving disc 92 is fixed axially and rotatively to a driving or armature shaft 94 of a reversible motor 95, which shaft is journaled at one end in a ball bearing 96 close to the disc 92, and extends into a housing 98 of the motor 95 through an electromagnet 100.

The bearing 96 is supported in a non-rotative member 102 in the form of a channeled ring, the channel of which opens radially outwardly and one side of which nests between the housing portion 82 and a casing 104 of the electromagnet 100 next to the motor housing 98. The latter and the casing 104 are secured to each other, as by bolts 106 and to the housing portion 82 as by screws 107.

Figure 5:
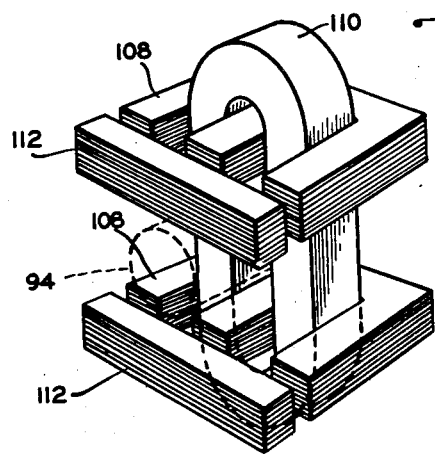
Figure 5 is a detail perspective of an electromagnet shown in Figure 1.

The electromagnet 100, see also Figure 5, comprises a pair of parallel plane laminated field cores 108 of substantially E-shape mounted in register with each other at opposite sides of, and spaced from, the motor shaft 94, with the legs of each core or E extending along the shaft away from the motor housing 98. A coil winding 110 links the middle legs of the cores 108 around, and spaced from, the shaft 94, and is electrically connected to the motor 95 for energization and deenergization therewith.

Laminated movable armatures 112, disposed one opposite the pole ends of the legs of each core 108, are carried by a diamagnetic plate 114 having pins 116, of which there are four in this instance, parallel to the shaft 94 fixed to the plate and slidably extending through the bearing support member 102.

At the opposite side of the bearing support 102, the pins 116 carry a brake ring 118 of perimetral L-section, an axially extending portion of which constitutes the brake portion proper which is larger in inside diameter than the outside diameter of the driving disc 92 and is adapted to extend across the driving disc clearing the latter, as shown, to engage the clutch disc 84.

Axially extending pins 120, fixed to the bearing support 102, are surrounded by springs 122 of greater force or strength than the spring 86 for biasing the brake 118 to the left, with the plate 114 against one side of the member 102 as shown in Figure 1. The opposite side of the member 102 limits movement of the brake to the right to a position, in which the armatures 112, in the energized condition of the coil 110, are spaced from the pole ends of the cores 108 by a slight air gap, thus ensuring substantially maximum magnetic pull by the cores, and preventing sticking of the armatures to the cores, which is conducive to easy and rapid release of the armatures under the action of the springs 122 when the coil 110 is deenergized. The laminated construction of the cores 108 and the armatures 112 further conduces to easy release of the armatures by reducing residual magnetism. The brake 118 is limited in its movement to the left by engagement of the plate 114 with the bearing support 102, which also determines the operating limit of movement of the clutch disc 84 to the left by brake 118.

The clutch disc 84 is provided with a circular radial band or ring-like friction facing element 124 disposed and having radial width sufficient to span the adjacent faces of the driving disc 92 and the brake ring 118, which it alternately engages.

In operation, with the parts positioned as they are when the coil 110 is deenergized, as illustrated in Figure 1, the motor 95 is also deenergized, under which condition since the brake 118 is held against the member 102 by the springs 122, the clutch disc 84 is forced against the brake by the spring 86, whereby the pinion 72 and the mechanism at the output side of the pinion are prevented from being moved.

When the motor 95 and the coil 110 are energized, under which condition the parts are positioned as indicated in Figure 2, simultaneously with the rapid acceleration of the motor shaft 94, the armatures 12 are at first attracted to the cores 108 against a force required to be only slightly greater than the difference between the force of the springs 122 and the spring 86, this reduced pull being at a time when the armatures 112 are farthest from the cores 108 and continuing until the friction disc 84 engages the driving disc 92. Upon this action, when the armatures 112 are closer to the cores 108 in a stronger flux field, the brake 118 is more readily pulled free from the clutch disc 84 against the full force of the springs 122. With the driven shaft 74 thus connected to the driving shaft 94, the motion is transmitted through the pinion 72, the gear train 70 and the gear 68 to the screw shaft 20.

When the motor 95 and the coil 110 are deenergized, under which condition, the parts return from the positions of Figure 2 to the positions of Figure 1, the clutch disc 84 is forced against the brake 118 and disconnected from the driving disc 92.

In the action described, since both the nut portion 24 of the screw shaft 20 and the gear housing 32 are held against turning by the eyes 10 and 12, respectively, through the attachment thereof, the nut and its tubular portion 16 together with the eye 10 are moved in one direction or the other relative to the eye 12, assuming the latter to be attached to a stationary base.

The springs 46 cushion the shock of stopping the tube 16, in case of excessive overtravel for any reason, and by preloading the shaft and the nut, they prevent jamming therebetween and render it easier to reverse rotation of the shaft.

Figure 6:
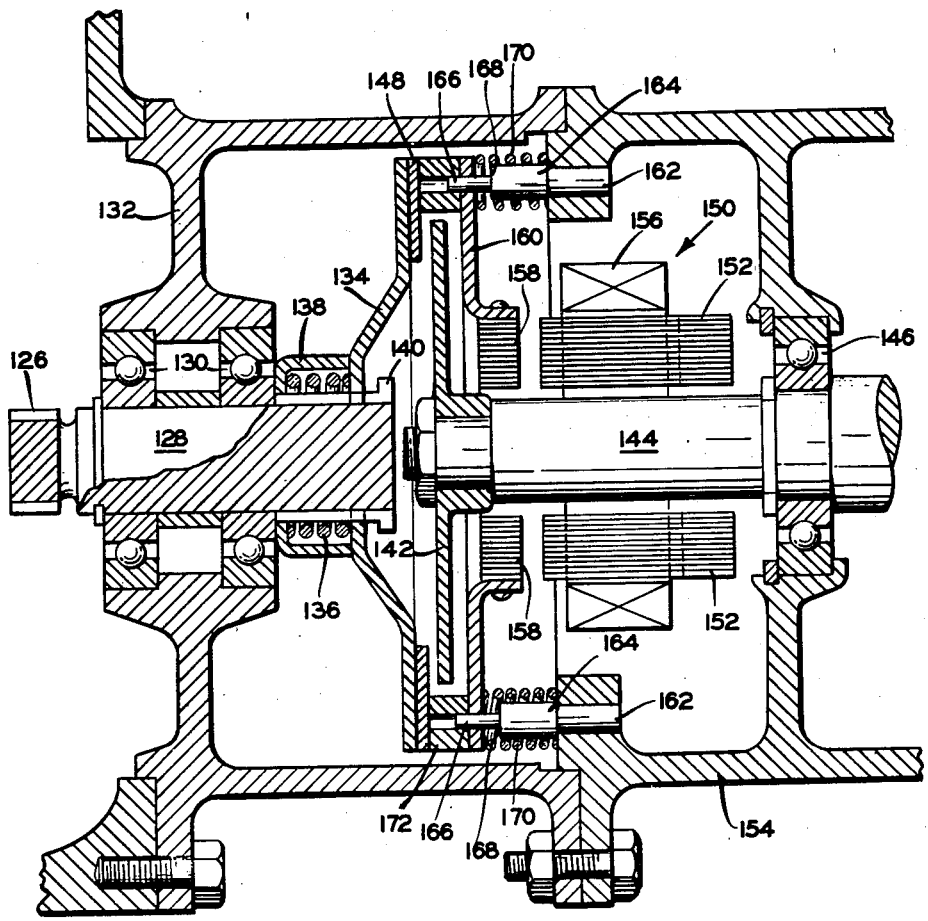
Figure 6 is a view similar to a portion of Figure 1, of a modified form of such portion adapted for cooperation with the remainder of the structure of Figure 1.

Referring to Figure 6 in the modification of the invention therein shown, a pinion 126, corresponding to the pinion 72 of Figure 1, is similarly fixed to a driven shaft 128, which is journaled in anti-friction bearings 130 in a housing portion 132.

A clutch disc 134 is splined to the driven shaft 128 for rotative movement therewith and axial movement relative thereto, being biased to the right, as shown in the figure, by a spring 136 of given force around the shaft 128 between the disc 134 and the bottom end of a cup 138 around the shaft 128. The cup 138 has its bottom end against the inner race of the adjacent bearing 130, and its open end constituted as a stop for limiting movement of the disc 134 to the left. A flange 140 on the shaft 128, limits movement of the disc 134 to the right. The disc 134 carries a friction facing band or ring 148 corresponding to the element 124.

A driving disc 142, corresponding to the disc 92 of Figure 1, is fixed axially and angularly to a driving or motor armature shaft 144, which is journaled in bearings 146 of the motor.

An electromagnet 150, corresponding to the magnet 100, comprises a pair of parallel plane laminated field cores 152 of substantially E-shape mounted, in a housing 154 of the motor, in register with each other at opposite sides of, and spaced from, the armature shaft 144, with the legs of each core extending along the shaft toward the driving disc 142.

A coil winding 156 links the middle legs of the cores 152 around, and spaced from, the shaft 144, and is electrically connected to the motor for energization and deenergization therewith.

Laminated movable armatures 158, corresponding to the armatures 112, disposed one opposite the pole ends of each core 152, are carried by a diamagnetic plate 160.

A plurality of pins 162, in this case four, are fixed to the housing 154 around the shaft 144, and each provided with a portion 164 of large diameter, and a small diametered guide pin portion 166, providing the portion 164 with a radial shoulder 168.

The plate 160 is axially slidably mounted on the pin guide portions 166, and biased to the left, as by springs 170, around the pin portion 164, which springs are of greater force than the spring 136. A brake ring 172 secured to the plate 160, is mounted on the guide pins 166, which ring is of greater inside diameter than the driving disc 142 and, in this case, has an outer diameter substantially equal to outer diameter of the clutch disc 134. The shoulders 168 limit movement of the armatures 158 to the right to a position, in which the armatures, in the energized condition of the coil 156, are spaced from the pole ends of the cores 152 by a slight air gap for the reasons pointed out above.

The operation of the device of Figure 6, is similar to that of the device of Figures 1 to 5, inclusive, above set forth, whereby, with the parts positioned as shown, and the coil 156 deenergized, the springs 170 prevail over the spring 136 to engage the brake 172 to the clutch disc 134, and to move the latter to position against the cup 138, in which position the braking force of the springs 170 is the full force of the latter springs.

When the coil 156 is energized, the armatures 158 are first attracted to the cores 152 against a force required to be only slightly greater than the difference between the force of the springs 170 and the spring 136, and subsequently against the full force of the springs 170, as in the above-described operation of the device of Figures 1 to 5, inclusive.

Referring to Figure 7, the modification therein shown is similar in operation and construction to the forms previously set forth, with certain exceptions providing it with advantages in certain applications. It comprises a pinion 174, corresponding to the pinions 72 and 126, which is also fixed to a driven shaft 176 journaled in antifriction bearings 178 held in a housing section 180, as by a shoulder 182, a spacer 184 between the bearings, and a ring 186 secured to the housing section, as by screws. The driven shaft 176 has a shoulder 188, at the left end of a hollow section of the shaft, and carries a lock-ring and groove device 190, at the right end of the hollow section.

A clutch disc 192 is splined to the driven shaft 176, between the shoulder 188 and the lock ring 190, for rotation with, and axial movement relative to, the shaft, and is biased to the right by a spring 194 of given force disposed around the shaft between the shoulder 188 and the disc 192. The disc 192 carries a friction facing band or ring 202.

A driving disc 196 is fixed, as by a nut 197 in the hollow of the driven shaft 176, and held axially and rotatably to a driving or motor armature shaft 198, which is journaled in bearings 200 of the motor.

An electromagnet 204 comprises a casing core 206 of axial-plane substantially E-section having portions 208 of its outer legs disposed in rabbet grooves in the housing section 180 and a housing section 210, respectively. Means, such as screws 212, secure the housing sections 180 and 210 to each other, and clamp the electromagnet casing portion 208 between the housing sections. A coil winding 214 surrounds the middle leg of the casing 206 and is held in place by a diamagnetic plate 216. The middle leg of the core 206 is hollow, by which it surrounds the driving shaft 198 in spaced relation thereto, and has an inner flange 218.

An armature disc 220 has a brake ring portion 222 of larger inner diameter than the outer diameter of the driving disc 196, and a face depression in which the disc 196 is disposed. A diamagnetic tubular member 224 is fixed to the armature disc 220 and axially slidably mounted in the hollow of the middle leg of the core casing 206 by and against the action of a spring 226, which surrounds the shaft 198 between the flange 218 and the tubular member 224, and is of greater force than the spring 194. A diamagnetic face ring 228, which in this instance is on the armature disc 220, holds the latter in slightly spaced relation to the core 206 when the coil 214 is energized. The armature disc 220 is held against rotation, and adapted for axial movement as by a pin or pins 230, in the housing section 180 which coact with a slot or slots 232 in the armature disc. When the coil 214 is deenergized, the space between the armature disc 220 and the core 206, is limited by a shoulder 234 formed in the housing 180.

The operation of the device of Figures 7 and 8 is similar to that of the above-described figures whereby, with the parts positioned as shown in Figure 7, and the coil 214 deenergized, the spring 226 prevails over the spring 194 to engage the brake 222 to the shoulder 234 whereby the clutch disc 192 is engaged to the brake under the force of the spring 194.

When the coil 214 is energized, in which the parts assume the positions of Figure 8, the armature disc 220 is first attracted to the core 206 against a force required to be only slightly greater than the difference between the force of the spring 226 and the spring 194, and subsequently against the full force of the spring 226.

Although only three embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. The combination of an electric motor, electromagnetic means including a pair of parallel plane laminated field cores of substantially E-shape mounted in register with each other at opposite sides of and spaced from the motor shaft with the legs of the cores extending along said shaft, a coil linking the middle legs of said cores around said shaft spaced from the latter and adapted to be energized and deenergized with said motor, and a laminated movable armature opposite the legs of each core, a bearing support, a bearing between said shaft and said support, a driving disc fixed to said shaft, a plate carrying said armatures, an axially movable brake ring, pins fixed to said ring and said plate and slidably extending through said support, spring supporting means fixed to said support, brake springs supported by said spring supporting means exerting a given force between said support and the brake, a driven shaft aligned with said motor shaft, a friction clutch disc axially movably splined to said driven shaft, a bearing supporting said driven shaft, a clutch spring around said driven shaft adapted to bias the clutch with a force less than said given force to alternately engage said brake and said driving disc, energization of said motor and coil causing said armatures to pull said brake toward said support against the action of said brake springs and to cause said clutch spring to force said clutch disc against said driving disc, and deenergization of said motor and coil causing said brake springs to force said brake into engagement with said support and to disengage the clutch disc from said driving disc and to cause said clutch spring to force the clutch disc against the brake.

2. The combination of a pair of housing portions, a motor having a portion of its rotor shaft in one of said housing portions, electromagnetic means including a core in the form of a casing of axial-plane substantially E-section having a hollow middle leg around said shaft portion and portions of its outer legs between said housing portions, means securing said housing portions to each other and clamping said outer leg portions therebetween, a coil in said casing around said middle leg, an armature disc axially slidably and non-rotatively related to one of said housing portions and having a tubular non-magnetic guide portion in said middle leg and an outer perimetral radial braking surface, means maintaining a given minimum flux gap between said armature and said core, a compression spring of given force surrounding said shaft portion and bearing against said tubular guide portion, stop means limiting movement of said armature away from said core, a driving disc fixed to said shaft portion in a face depression of said armature disc, a driven shaft aligned with said shaft portion, and having a shoulder, a friction clutch disc rotatable with and axially movable relative to said driven shaft, and a compression spring of lesser force around said driven shaft between said shoulder and said friction clutch disc biasing the latter toward said braking surface and said driving disc, said motor and said coil being electrically connected such that, when they are energized, said armature disc is actuated against said first spring to release said braking surface axially from said friction clutch disc and the latter is forced by said second spring into engagement with said driving disc and, when the motor and the coil are deenergized, said first spring forces the brake surface axially against said friction clutch disc in opposition to said second spring and moves said friction clutch disc out of engagement with said driving disc.

3. The combination of an electric motor, electromagnetic means including a pair of parallel plane laminated field cores of substantially E-shape mounted in register with each other at opposite sides of and spaced from the motor shaft with the legs of the cores extending along said shaft, a coil linking the middle legs of said cores and said shaft spaced from the latter and adapted to be energized and deenergized with said motor, and a laminated movable armature opposite the legs of each core, pins fixed in position about said shaft and having radial shoulders and guide portions, a diamagnetic plate axially slidable on said guide portions and supporting said armatures clear of said shaft, said plate engaging said shoulders when said coil is energized to hold said armatures slightly spaced from said cores, a brake ring fixed to said plate, brake springs around said pins, a driving disc fixed to said shaft, a driven shaft aligned with said motor shaft, a friction clutch disc axially movably splined to said driven shaft, a cup surrounding said driven shaft with its open end constituting a stop for said clutch disc, and a clutch spring in said cup of less strength than said brake springs biasing said clutch disc to alternately engage said brake ring and said driving disc, energization of said motor and coil causing said armatures to pull said brake axially toward said pin shoulders against the action of said brake springs and to cause said clutch spring to force said clutch disc axially against said driving disc, and deenergization of said motor and coil causing said brake springs to force said brake axially into engagement with said clutch disc to disengage the latter from said driving disc and to force the clutch disc against said stop.

4. The combination of a driving shaft, a driven shaft axially aligned with and having an end adjacent to an end of said driving shaft, a driving member on said driving shaft adjacent to its said end and rotatable therewith and having a ring-like outer perimetral lateral friction surface element facing in direction toward said driven shaft, a non-rotative brake member having a ring-like outer perimetral lateral friction surface element of larger inside diameter than the outer diameter of said driving friction surface element and facing and biased in said direction under a given force, means limiting movement of said brake surface element against said bias, a clutch member on said driven shaft adjacent to its said end and rotatable therewith and having a ring-like outer perimetral lateral friction surface element radially spanning and facing and biased toward said driving and braking surface elements under a smaller force, means limiting movement of said driven clutch surface element against said smaller force bias, and actuating means operating when energized to disengage said brake surface element from said driven clutch surface element against said given force bias and to cause said driven clutch surface element to engage said driving clutch surface element under said smaller force bias, deenergization of said actuating means permitting said given force bias to engage said brake surface element to said driven clutch surface element and to move the latter against said smaller force bias away from said driving clutch surface element.

5. The combination of an electric motor, electro-magnetic means including a laminated field core means having pole end means, coil winding means cooperating with said core means and adapted to be energized and deenergized therewith, and laminated movable armature means opposite said pole end means, a brake movable by said armature means axially of the motor shaft, said armature means being slightly spaced from said core means when said coil is energized, means biasing said brake axially of the shaft, with a given force, a driving disc fixed to said shaft, a driven shaft aligned with said motor shaft, a friction clutch disc rotatable with and axially movable relative to said driven shaft and cooperating with said brake and with said driving disc, and means of less force than said biasing means biasing said clutch to alternately engage said brake and said driving disc, energization of said motor and said coil causing said armature means to pull said brake away from said clutch and said second biasing means to force said clutch against said driving disc, and deenergization of said motor and said coil causing said first biasing means to force said brake into engagement with said clutch disc and to disengage the latter from said driving disc.

6. The combination of an electric motor, electro-magnetic means including a core in the form of a casing of axial substantially E-section having a hollow middle leg around the motor shaft, a coil in said casing around said middle leg, an axially slidable armature disc having a tubular guide portion in said leg and carrying an outer perimetral brake portion, means adapted to maintain minimum flux gap between said armature and said core, a compression spring surrounding said shaft and bearing against said guide portion, a driving disc carried by said shaft, a driven shaft, a clutch disc rotatable with and axially movable relative to said driven shaft, and a compression spring around said driven shaft biasing said friction disc toward said brake portion and said driving disc, said motor and said coil being electrically connected to each other such that when energized said armature disc is actuated against said first spring to release said brake portion from said clutch disc and the latter is forced by said second spring means into engagement with said driving disc and, when the motor and the coil are deenergized, said first spring forces said brake portion against said clutch disc in opposition to said second spring and moves said clutch disc out of engagement with said driving disc.

7. In means comprising an electric motor, and means to be driven by said motor, the combination of a driving element actuated by said motor, a non-rotative brake carried by an axially movable member, means biasing said member axially with a given force, means adapted to stop movement of said brake against its bias, a friction clutch mounted on said driven means for rotation therewith and axial movement relative thereto, means biasing said clutch toward said brake and driving element against and with less force than said first biasing means, means adapted to stop movement of said clutch against its bias, and electro-magnetic means adapted to actuate said brake and clutch comprising a laminated core, coil means cooperating with said core electrically connected to said motor, and a laminated movable armature held by said movable member and by said first stopping means in slightly spaced relation to said core when said coil is energized, energization of said coil causing said armature to pull said brake away from said clutch and from said second biasing means to force said clutch against said driving element, and deenergization of said coil causing said first biasing means to force said brake into engagement with said clutch and to disengage the latter from said driving element.

8. In means comprising a driven member, and an electric motor adapted to drive said driven member, the combination of means comprising a driving element actuated by said motor, a movable brake, means biasing said brake towards said driving element with a given force, means adapted to stop movement of said brake against said bias, a friction clutch mounted on said driven member rotatable therewith and movable relative thereto, means biasing said clutch toward said brake and said driving element with less force than said first biasing means, means adapted to stop movement of said clutch against its bias, and electromagnetic means adapted to actuate said brake and clutch comprising a core, coil means cooperating with said core electrically connected to said motor, and a movable armature operatively connected to said brake and held in slightly spaced relation to said core when said coil means is energized, energization of said coil means causing said armature to pull said brake away from said clutch and from said second biasing means to permit the latter to force said clutch against said driving element, and de-energization of said coil means causing said first biasing means to force said brake into engagement with said clutch and the latter to move against its biasing means away from said driving element.

9. The combination of a rotatable driving member having an outer perimetral clutch portion, a non-rotative brake member having an outer perimetral brake portion of greater inner radius than and biased away from said driving clutch portion under a given force, said brake portion being limited in its movement against said bias, a rotatable driven member having a clutch portion laterally spanning and biased toward said driving clutch portion and said brake portion under a smaller force, said driven clutch portion being limited in its movement against said smaller force bias, and actuating means operating to disengage said brake portion from said driven clutch portion against said given force bias and to cause said driven clutch portion to engage said driving clutch portion under said smaller force bias, release of said actuating means permitting said given force bias to engage said brake portion to said driven clutch portion and to move the latter against said smaller force bias to disengage said driving clutch portion.

10. The combination of a driving shaft, a driven shaft axially aligned with and having an end adjacent to an end of said driving shaft, a driven clutch member on said driven shaft adjacent to its said end and rotatable therewith and having a ring-like outer perimetral lateral friction surface element facing in direction toward said driving shaft, a non-rotative brake member having a ring-like outer perimetral lateral friction surface element of larger inside diameter than the outer diameter of said friction surface element of said driven clutch member and facing and biased in said direction under a given force, a driving clutch member on said driving shaft adjacent to its said end and rotatable therewith and having a ring-like outer perimetral lateral friction surface element radially spanning and facing and biased toward said friction surface elements of said driven clutch member and said brake member under a smaller force, means limiting movement of said brake member by said given force biasing means, and actuating means operating when energized to disengage said friction surface element of said brake member from said friction surface element of said driving clutch member against said given force bias and to cause said friction surface element of said driving clutch member to engage said friction surface element of said driven clutch member under said smaller force bias, deenergization of said actuating means causing said given force bias to engage said friction surface element of said brake member to said friction surface element of said driving clutch member and to move the latter against said smaller force bias away from said friction surface element of said driven clutch member.

11. In means comprising a driven member, and an electric motor adapted to drive said driven member, the combination of means comprising a driving element actuated by said motor, an axially movable brake, means biasing said brake axially towards said driving element with a given force, a friction clutch mounted on said driven member rotatable therewith and movable relative thereto, means biasing said clutch axially toward said brake and said driving element with less force than said first biasing means, means adapted to limit movement of said brake against said clutch biasing means, and electromagnetic means adapted to actuate said brake and clutch comprising a core, coil means cooperating with said core electrically connected to said motor, and a movable armature operatively connected to said brake and held in slightly spaced relation to said core when said coil means is energized, energization of said coil means causing said armature to pull said brake away from said clutch and from said second biasing means to permit the latter to force said clutch against said driving element, and deenergization of said coil means causing said first biasing means to force said brake into engagement with said clutch and the latter to move against its biasing means away from said driving element.

12. The combination of a rotatable driving member having an outer perimetral clutch portion, a non-rotative brake member having an outer perimetral brake portion of greater inner radius than and biased away from said driving clutch portion under a given force, a rotatable driven member having a clutch portion laterally spanning and biased toward said driving clutch portion and said brake portion under a smaller force, said brake member being limited in its movement against said smaller force bias, and actuating means operating to disengage said brake portion from said driven clutch portion against said given force bias and to cause said driven clutch portion to engage said driving clutch portion under said smaller force bias, release of said actuating means permitting said given force bias to engage said brake portion to said driven clutch portion and to move the latter against said smaller force bias to disengage said driving clutch portion.

13. The combination of electromagnetic means including a core having a portion of substantially E-shape, a coil around the middle leg of the core, and an armature at one end of the core and with the core forming a magnetic flux circuit, means biasing said armature away from the core, a structure adjacent to said end of said core and including a rotatable driving member, a rotatable driven member and a non-rotative brake member, and means adapted to operate against the action of said biasing means to cause engagement between said driving and driven members free from said brake member when said coil is energized, and to permit said biasing means to cause engagement between said driven and brake members free from said driving member when said coil is deenergized.

14. The combination of electromagnetic means including a core, a coil on the core and an armature at one end of said core forming with the core a magnetic flux circuit, means biasing said armature away from the core, a structure closely adjacent to said end of said core and including a rotatable driving member, a rotatable driven member, and a non-rotatable brake member, and means adapted to operate against the action of said biasing means to cause engagement between said driving and driven members free from said brake member when said coil is energized, and to permit said biasing means to cause engagement between said driven and brake members free from said driving member when said coil is deenergized.

15. In a clutch and brake structure, the combination of a driving shaft, a driving disc rotatable with the shaft thereon, a rotatable driven member, a clutch disc rotatable with said driven member, one of said discs being axially movably engageable with and disengageable from the other, means adapted to bias said discs in said relative movement toward each other under a given force, a brake member, means adapted to bias said brake member and clutch disc toward each other under a force greater than said given force, and electromagnetic means including a core in the form of a casing of axial substantially E-section having a hollow middle leg around the motor shaft, a coil in said casing around said middle leg, and means including an armature around said driving shaft adapted to move said brake member against its bias.

16. In a clutch and brake structure, the combination of a driving shaft, a driving disc rotatable with the shaft thereon, a rotatable driven member, a friction clutch disc rotatable with said driven member, one of said discs being axially movably engageable with and disengageable from the other, means biasing said discs in said relative movement toward each other under a given force, a non-rotatable brake member, means biasing said brake member and clutch disc toward each other under a force greater than said given force, and electromagnetic means including a pair of laminated field cores at opposite sides of and spaced from said shaft, a coil linking said cores and said shaft spaced from the latter, and a laminated movable armature opposite each core adapted to move said brake member against its bias.

17. In a structure comprising a rotatable driving member, and a rotatable driven member, the combination of a friction clutch plate rotatable with said driven member, means adapted to relatively bias said clutch plate and driving member into frictional engagement with each other under a given force, a non-rotative brake member, means adapted to relatively bias said clutch plate and brake member toward each other under a force greater than said given force to move said clutch plate out of contact with said driving member, and means adapted to separate said member, and means adapted to separate said clutch plate and brake member and to cause the aforesaid frictional engagement between the clutch plate and the driving member.

18. In an electrically actuated clutch and brake structure, the combination of a rotatable driving member, a rotatable driven member, a friction clutch plate rotatable with and axially movable relative to said driving and driven members, means adapted to bias said clutch plate in said relative movement toward said driving member with a given force, an axially movable non-rotative brake member, means adapted to bias said brake member toward said clutch plate with a force greater than said given force to move said clutch plate out of contact with said driving member, and electro-responsive means having a force greater than the difference between said biasing forces for moving said brake member out of contact with said clutch plate and causing the latter to engage said driving member under said given force.

19. In a structure comprising a rotatable driving member and a rotatable driven member, the combination of cooperating clutch elements on said members, respectively, an axially movable brake member, and means including an electromagnetic device and having alternate operations, one of which moves said brake member to engage said brake member and said driving clutch element to each other and disengage said driven clutch element and said driving clutch element from each other and the other of which moves the brake member to disengage said brake member and said driving clutch element from each other and to engage said driven clutch element and said driving clutch element to each other.

LEONARD OCHTMAN.

REFERENCES CITED

The following references are of record in the file of this patent:

UNITED STATES PATENTS

| Number | Name | Date |
|---|---|---|
| 2,267,114 | Lear et al. | Dec. 23, 1941 |
| 2,411,101 | Millus | Nov. 12, 1946 |